(12) United States Patent
Kobayashi

(10) Patent No.: US 11,838,627 B2
(45) Date of Patent: Dec. 5, 2023

(54) IMAGING APPARATUS, CONTROL METHOD FOR IMAGING APPARATUS, AND STORAGE MEDIUM

(71) Applicant: CANON KABUSHIKI KAISHA, Tokyo (JP)

(72) Inventor: Shigeyuki Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 17/834,749

(22) Filed: Jun. 7, 2022

(65) Prior Publication Data
US 2022/0400209 A1    Dec. 15, 2022

(30) Foreign Application Priority Data
Jun. 10, 2021  (JP) .................... 2021-097304

(51) Int. Cl.
*H04N 23/67* (2023.01)

(52) U.S. Cl.
CPC ......... *H04N 23/673* (2023.01); *H04N 23/675* (2023.01)

(58) Field of Classification Search
CPC ..... H04N 23/67; H04N 23/675; H04N 23/673
USPC ........................................................ 348/347
See application file for complete search history.

(56) References Cited

U.S. PATENT DOCUMENTS

| 9,578,232 | B2* | 2/2017 | Hamano | H04N 23/741 |
| 11,263,751 | B2* | 3/2022 | Saha | G06F 18/2431 |
| 11,277,554 | B2* | 3/2022 | Kurisu | H04N 23/673 |
| 11,317,013 | B2* | 4/2022 | Aoki | H04N 23/663 |
| 11,582,408 | B2* | 2/2023 | Niwa | H04N 25/707 |
| 11,611,707 | B2* | 3/2023 | Camacho | G06T 7/207 |
| 2008/0193042 | A1* | 8/2008 | Masuda | G06T 3/0062 |
|  |  |  |  | 382/275 |
| 2012/0081578 | A1* | 4/2012 | Cote | H04N 23/673 |
|  |  |  |  | 348/E5.024 |
| 2016/0205309 | A1* | 7/2016 | Hamano | H04N 23/741 |
|  |  |  |  | 348/353 |
| 2020/0134827 | A1* | 4/2020 | Saha | G06F 18/2431 |
| 2020/0228721 | A1* | 7/2020 | Kurisu | H04N 23/675 |
| 2020/0351455 | A1* | 11/2020 | Niwa | H04N 25/77 |
| 2020/0404156 | A1* | 12/2020 | Aoki | G03B 13/34 |
| 2021/0400180 | A1* | 12/2021 | Omata | G06T 7/80 |
| 2022/0377242 | A1* | 11/2022 | Camacho | H04N 23/61 |
| 2023/0247314 | A1* | 8/2023 | Imoto | H01L 27/14612 |
|  |  |  |  | 348/294 |

FOREIGN PATENT DOCUMENTS

JP    2019134271 A    8/2019

* cited by examiner

*Primary Examiner* — Pritham D Prabhakher
(74) *Attorney, Agent, or Firm* — CANON U.S.A., INC. IP Division

(57) ABSTRACT

An apparatus includes a control unit configured to control a position of a focus lens of the apparatus, a setting unit configured to change a threshold for detecting a luminance change in each pixel in a predetermined range, an acquisition unit configured to acquire a signal indicating a pixel in which a luminance change that is more than or equal to the threshold has occurred, and a determination unit configured to determine an in-focus position of the focus lens based on the signal detected depending on the position of the focus lens and the set threshold.

19 Claims, 8 Drawing Sheets

IMAGING APPARATUS, CONTROL METHOD FOR IMAGING APPARATUS, AND STORAGE MEDIUM

BACKGROUND

Technical Field

The aspect of the embodiments relates to autofocus of an event-based sensor.

Description of the Related Art

Japanese Patent Application Laid-Open No. 2019-134271 discusses an event-based sensor that outputs a luminance change of each pixel as an address event signal in real time.

SUMMARY

According to an aspect of the embodiments, an apparatus includes a control unit configured to control a position of a focus lens of the apparatus, a setting unit configured to change a threshold for detecting a luminance change in each pixel in a predetermined range, an acquisition unit configured to acquire a signal indicating a pixel in which a luminance change that is more than or equal to the threshold has occurred, and a determination unit configured to determine an in-focus position of the focus lens based on the signal detected depending on the position of the focus lens and the set threshold.

Further features of the disclosure will become apparent from the following description of exemplary embodiments with reference to the attached drawings.

DESCRIPTION OF THE EMBODIMENTS

An event-based sensor is expected to be applied to a camera for security.

In a security camera, images are captured in a low light intensity environment such as surveillance at night. In such a scene, an aperture value is reduced to increase an amount of light to be received by a sensor and images are captured using the aperture value in many cases. Setting a small aperture value reduces a depth of field, and for this reason, focusing on a subject is often necessary. For this reason, an autofocus (AF) function for enabling a user to easily perform focusing may be desired.

As a known autofocus technique, there is so-called contrast AF, but it is difficult to apply the technique to the camera employing the event-based sensor for the following reason. In the contrast AF, an in-focus position is determined based on a contrast evaluation value expressing the level of contrast in a specific region (hereinafter referred to as the AF evaluation frame) in an image. In other words, a position when the contrast evaluation value is at its peak is determined to be the in-focus position. As a typical method of calculating the contrast evaluation value, there are methods such as a method of calculating the ratio between the maximum luminance and the minimum luminance within the AF evaluation frame, and a method of calculating the difference between the maximum luminance and the minimum luminance.

In the event-based sensor, however, only three values (e.g., +1 representing a positive luminance change, −1 representing a negative luminance change, and 0 representing no luminance change) are used as a value representing a luminance change of a pixel. In the event-based sensor, except for a case where light incident on the sensor uniformly changes, such as a change in brightness of illumination or diaphragm aperture diameter, both positive and negative changes occur in many cases. For this reason, even if a known formula for calculating the contrast evaluation value is applied, the same evaluation value is calculated regardless of whether focus is achieved, and thus the in-focus position cannot be determined. Accordingly, an issue to be addressed by the aspect of the embodiments is to enable autofocus in an imaging apparatus employing an event-based sensor.

An imaging apparatus according to each of exemplary embodiments of the disclosure will be described below with reference to the drawings. In the following description, components having identical functions are denoted by identical numerals in all the drawings, and the description thereof will not be repeated.

Figure 1:
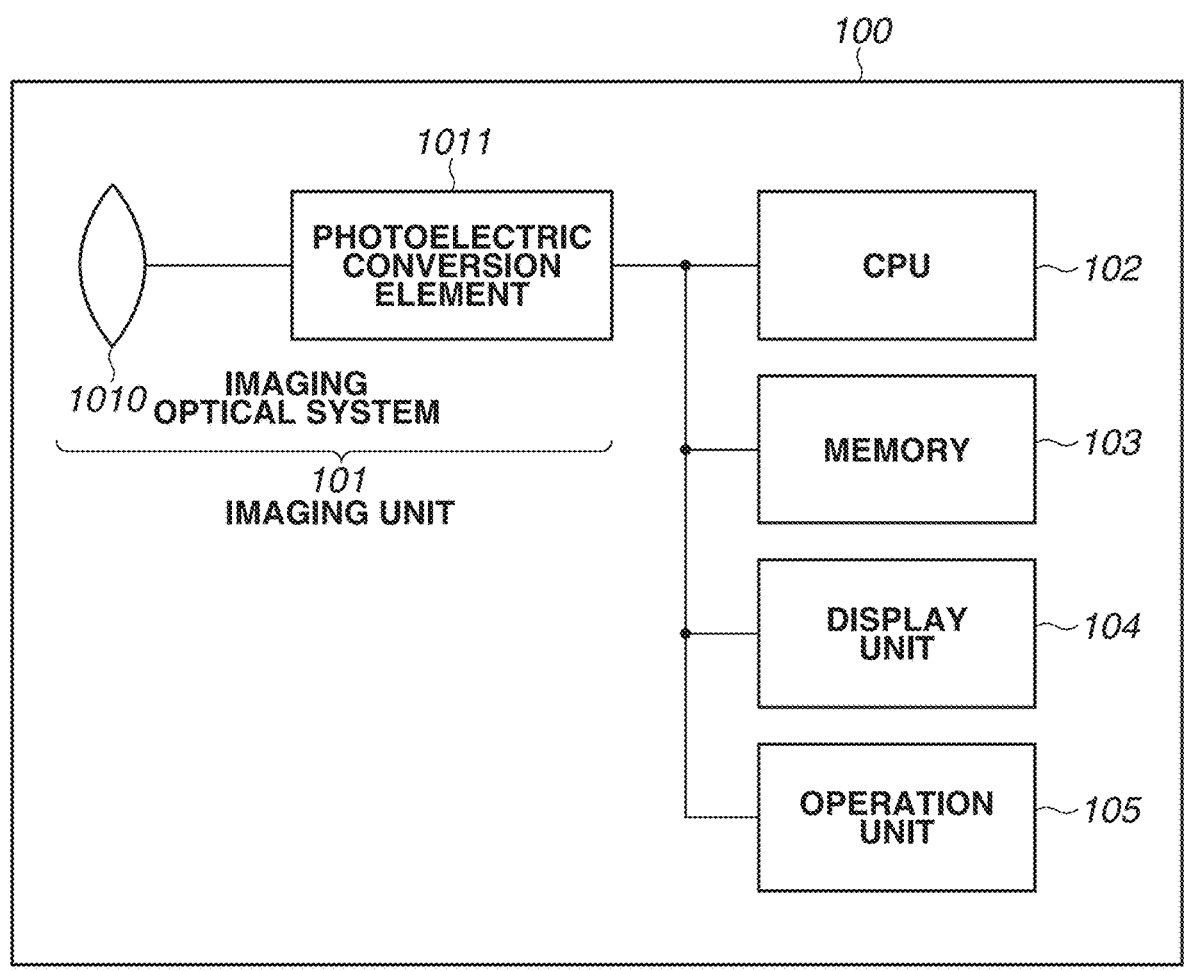
FIG. 1 is a block diagram illustrating a hardware configuration example of an imaging apparatus.

<Hardware Configuration of Imaging Apparatus: FIG. 1>

A first exemplary embodiment will be described. FIG. 1 is a schematic diagram illustrating a hardware configuration example of an imaging apparatus (an information processing apparatus) 100.

The imaging apparatus 100 is, specifically, an imaging apparatus having an event-based sensor, but a function of performing image processing and a function of executing analysis processing (motion detection) on an image may be included in separate apparatuses. The imaging apparatus 100 includes an imaging unit 101 including an imaging optical system 1010 and a photoelectric conversion element 1011, a central processing unit (CPU) 102, a memory 103, a display unit 104, and an operation unit 105. The photoelectric conversion element 1011 is an event-based sensor that outputs an address event signal corresponding to received incident light. The event-based sensor detects a luminance change in each pixel as an event, and the address event signal indicates the position and the time of the pixel in which the luminance change has occurred. The imaging optical system 1010 is, specifically, a light receiving lens, receives incident light, and forms an image on the photoelectric conversion element 1011. The CPU 102 reads out and executes an operating system (OS) and other program stored in the memory 103, and controls each connected configuration based thereon, thereby performing calculations, logical determination, and the like, for various types of processing. Information processing according to the present exemplary embodiment is included in the processing executed by the CPU 102.

The CPU 102 controls focus driving and aperture driving of the imaging optical system 1010, driving of the photoelectric conversion element 1011, and the like. The memory 103 is, for example, a hard disk drive or an external storage device, and stores a program according to the information processing of the exemplary embodiment and various data. The display unit 104 is, for example, a display device that displays a calculation result and the like of the imaging apparatus 100 based on an instruction from the CPU 102. The display device may be of any type, such as a liquid crystal display device, a projector, and a light emitting diode (LED) indicator. The operation unit 105 is, for example, a touch panel, a keyboard, a mouse, or a robot controller, and is a user interface for accepting an instruction input by the user. The imaging apparatus 100 may have a mechanism other than the hardware configuration described here.

Figure 2A:
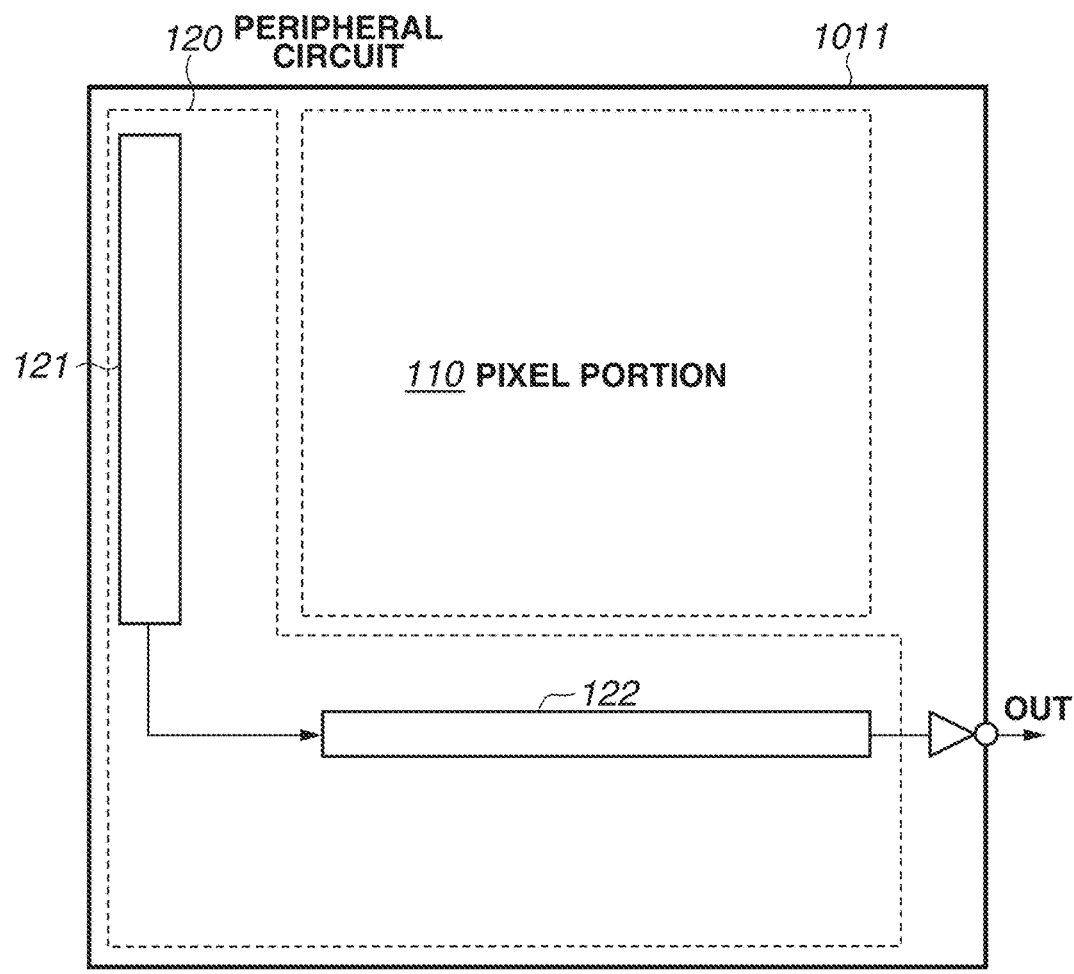
FIGS. 2A and 2B are diagrams illustrating a configuration example of an event-based sensor.
Figure 2B:
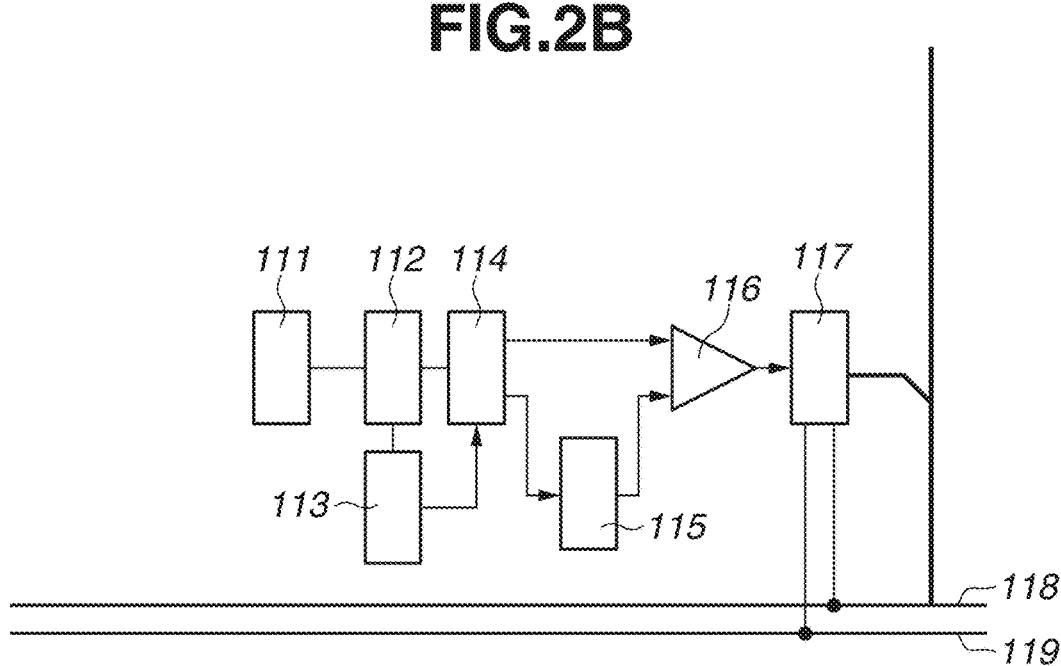

<Photoelectric Conversion Element: FIGS. 2A and 2B>

An example of the event-based sensor according to the present exemplary embodiment will be described. The event-based sensor counts the number of incident photons, and determines the timing when the number of the counted photons exceeds a predetermined threshold. The event-based sensor measures a time (a clock frequency) required before the number of photons becomes more than or equal to a first threshold, and detects a luminance change by comparing the required times. Specifically, when the previously measured required time is $T_0$ and the latest required time is T, a luminance change in the minus direction is detected in a case where a difference $T-T_0$ is more than or equal to a second threshold. In a case where a difference $T_0-T$ is more than or equal to the second threshold, a luminance change in the plus direction is detected. No luminance change is detected if the difference between T and $T_0$ is less than the second threshold. The second threshold is a value more than or equal to zero, and a value set beforehand or a value set based on other parameter is used.

A detailed configuration will be described below. FIG. 2A is a diagram illustrating a configuration example of the photoelectric conversion element 1011. The photoelectric conversion element 1011 includes a pixel portion 110 and a peripheral circuit 120. The peripheral circuit 120 includes a vertical arbitration circuit 121 and a horizontal output circuit 122.

FIG. 2B is a diagram illustrating a configuration example of each pixel portion constituting the event-based sensor. The pixel portion 110 includes a photoelectric conversion unit 111, a pixel counter 112, a time counter 113, a first determination circuit 114, a memory 115, a comparator 116, a second determination circuit 117, a response circuit 118, and a selection circuit 119. The photoelectric conversion unit 111 includes an avalanche photodiode (a single-photon avalanche diode (SPAD)) that operates in a Geiger mode, and is configured to count the number of photons incident on the photoelectric conversion unit 111, using the pixel counter 112. The time counter 113 counts the time during which photons are incident on the photoelectric conversion unit 111. The event-based sensor includes the SPAD so as to detect a one-photon level luminance change. A one-photon level luminance change is detected to obtain an address event signal even in a night vision state such as night-time.

When the number of photons counted by the pixel counter 112 reaches the first threshold, the first determination circuit 114 stops the time counter 113 from counting the time. The past count value of the time counter 113 is stored in the memory 115, and a count value of the difference between the current count value of the time counter 113 and the past count value of the time counter 113 is determined using the comparator 116.

In a case where the count value of the difference is more than or equal to the second threshold, the second determination circuit 117 transmits a request signal to the vertical arbitration circuit 121 via the response circuit 118. The response circuit 118 receives a response representing permission or non-permission of output of address event data, from the vertical arbitration circuit 121. In a case where the count value of the difference is less than the second threshold, the second determination circuit 117 does not transmit a request signal.

When the response circuit 118 receives a response representing permission of output, the count value of the time counter 113 is output to the horizontal output circuit 122 by the selection circuit 119. The horizontal output circuit 122 outputs the received count value from the photoelectric conversion element 1011 to a detection unit as an output signal.

The count value of the difference calculated by the comparator 116 corresponds to the reciprocal of the incidence rate of photons, and therefore, the photoelectric conversion element 1011 according to the present exemplary embodiment has a function of measuring a "change in incidence rate of photons", i.e., a luminance change. Using the second determination circuit 117, only in a case where the difference between the time intervals, each between the times when the number of incident photons reaches the first threshold, is more than or equal to the second threshold, an address event is output. In other words, the photoelectric conversion element 1011 outputs the incidence rate in a case where the difference between the incidence rates is more than or equal to the second threshold, and does not output the incidence rate in a case where the difference is less than the second threshold. The above-described configuration can implement an asynchronous-type photoelectric conversion element that detects a luminance change as an address event in real time, for each pixel address.

<Variation of Photoelectric Conversion Element>

In the above-described case, there is used the photoelectric conversion element that employs the SPAD for the photoelectric conversion unit and detects a change in incidence rate of photons by measuring the time during which photons are incident. However, if the photoelectric conversion element detects a luminance change as an address event in real time, the configuration in FIGS. 2A and 2B may not be provided. For example, a photoelectric conversion element that detects a luminance change as a voltage change as discussed in Japanese Patent Application Laid-Open No. 2019-134271 may be used.

Figure 3:
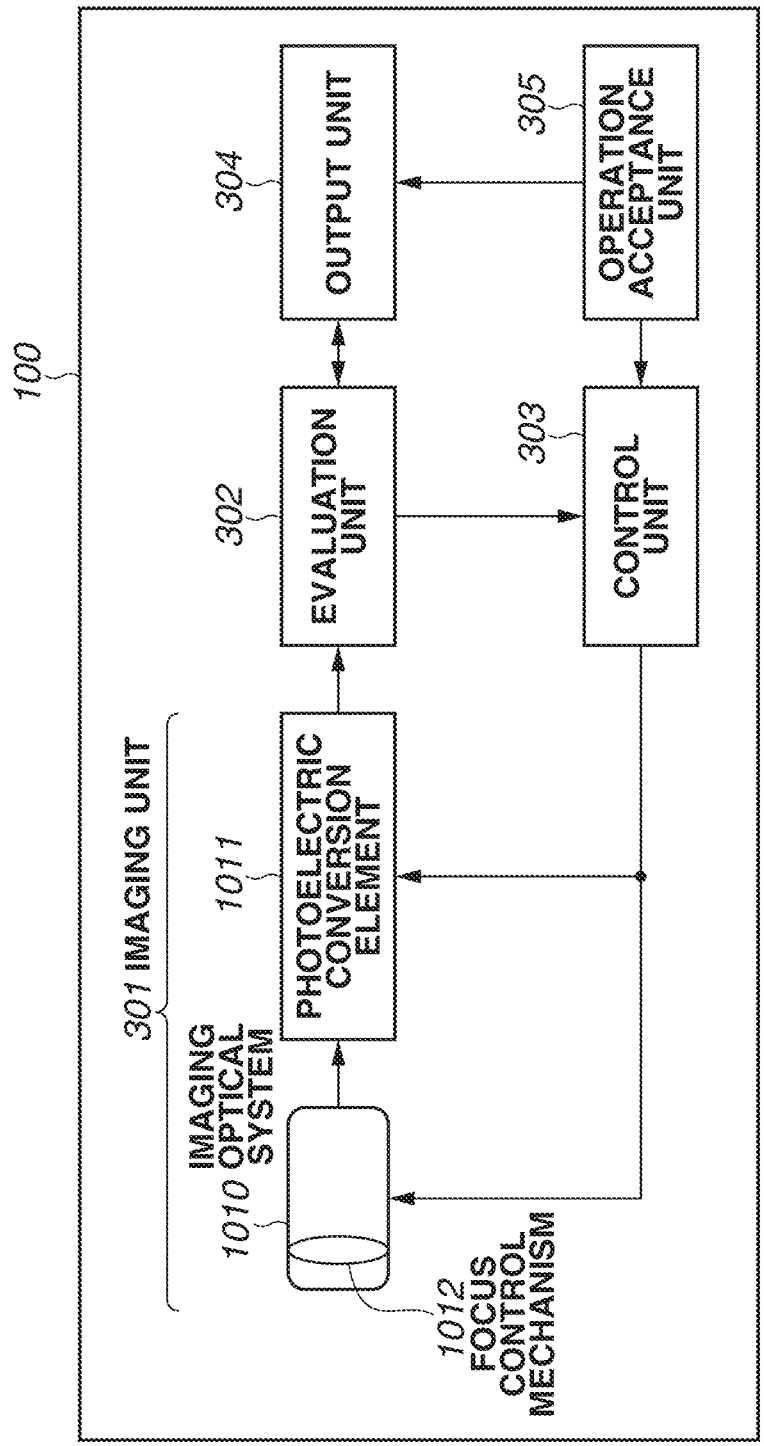
FIG. 3 is a block diagram illustrating a functional configuration example of the imaging apparatus.

<Imaging Apparatus: FIG. 3>

FIG. 3 illustrates a functional configuration example of the imaging apparatus (the information processing apparatus) 100 in the present exemplary embodiment. First, an overview will be described, and subsequently, the details of each function will be described. In FIG. 3, the imaging apparatus 100 includes an imaging unit 301, an evaluation unit 302, a control unit 303, an output unit 304, and an operation acceptance unit 305. The imaging unit 301 includes the imaging optical system 1010 including a focus control mechanism 1012 that can change the focus position and the photoelectric conversion element 1011 serving as the event-based sensor.

The imaging optical system 1010 includes, specifically, a light receiving lens, and the focus control mechanism 1012 includes a focus lens, an actuator for driving the lens, and the like. In the present exemplary embodiment, the focus control mechanism 1012 includes a stepping motor that can control the position of the focus lens by driving pulse. The imaging optical system 1010 and the focus control mechanism 1012 form a subject image on an image surface of the photoelectric conversion element 1011. The photoelectric conversion element 1011 outputs an address event signal corresponding to the received incident light. More specifically, an address event signal indicating the address and the time of a pixel in which a luminance change has occurred is output. The evaluation unit 302 acquires the address event signal output from the photoelectric conversion element 1011, and compares an integrated value of the total number of pixels in which a luminance change has occurred in a predetermined period with a predetermined threshold (a third threshold). The control unit 303 causes the focus lens to wobble (vibrate with small amplitude in an optical axis direction) via the focus control mechanism 1012. Further, the control unit 303 causes the second threshold to change (sweep) at a predetermined rate of change with respect to the photoelectric conversion element 1011, simultaneously with wobbling. The second threshold is a threshold for determining whether there is a sufficient difference between the time intervals, each between the times when the number of incident photons reaches the first threshold, and in a case where the time difference is more than or equal to the second threshold, an address event signal is output. In this process, in the evaluation unit 302, the number of pixels in which a luminance change occurs changes accompanying the change in the second threshold. The value of the second threshold when the number of pixels in which a luminance change has occurred falls below the third threshold is an evaluation value at that focus lens position. When the evaluation value is determined in the evaluation unit 302, the control unit 303 moves the focus lens by only a predetermined distance in the optical axis direction and then causes the focus lens to wobble again, and thereafter repeats the above-described contents, thereby determining the evaluation value at the relevant focus lens position. Eventually, the evaluation value at each position of the focus lens is determined, and a lens position at which the evaluation value is highest is determined as the in-focus position. The output unit 304 displays the address and the luminance change direction of a pixel in which a luminance change has occurred, an AF evaluation frame, and the like. The operation acceptance unit 305 accepts setting of an AF evaluation frame, input of a threshold for an address event to be described below, and the like, based on operations by the user. The output unit 304 and the operation acceptance unit 305 may be implemented by an external device of the imaging apparatus.

The details of each function will be described.
<Evaluation Unit>

The details of the evaluation unit 302 in FIG. 3 will be described. First, the control unit 303 changes the second threshold of the photoelectric conversion element 1011 at a predetermined rate of change, while wobbling the focus lens. Meantime, the evaluation unit 302 compares a value obtained by integrating the total number of pixels in which a luminance change has occurred in a specific time range with the third threshold based on an output signal of the photoelectric conversion element 1011. The value of the second threshold when the total number of pixels falls below the third threshold is the evaluation value at the relevant focus lens position. Here, the third threshold is a value greater than 0, and a preset value or a value set based on other parameter is used. The specific time range may be a minimum time width determined by a temporal resolution of the vertical arbitration circuit 121 of the photoelectric conversion element 1011, or a time range longer than the width may be used for the integration. The narrower the time width is, the more the focusing velocity improves, but the wider the time width is, the more the focusing accuracy can improve because the influence of an error caused by random noise or the like can be reduced.

The target region (the AF evaluation frame) for which the evaluation unit 302 counts the total number of pixels in which the luminance change has occurred may be the entire imaging range, or may be a preset region. Further, the target region may be a range designated by the user in the operation acceptance unit 305.

<Control Unit>

The control unit 303 causes the second threshold of the photoelectric conversion element 1011 to change (sweep) at a predetermined rate of change, while wobbling the focus lens, during the calculation of the evaluation value by the evaluation unit 302. When the focus lens is still, there is no change in a subject image, and nothing appears in captured image data of the photoelectric conversion element 1011, but wobbling makes the focus condition of the subject image constantly change, so that the subject is always displayed in the captured image.

Figure 4:
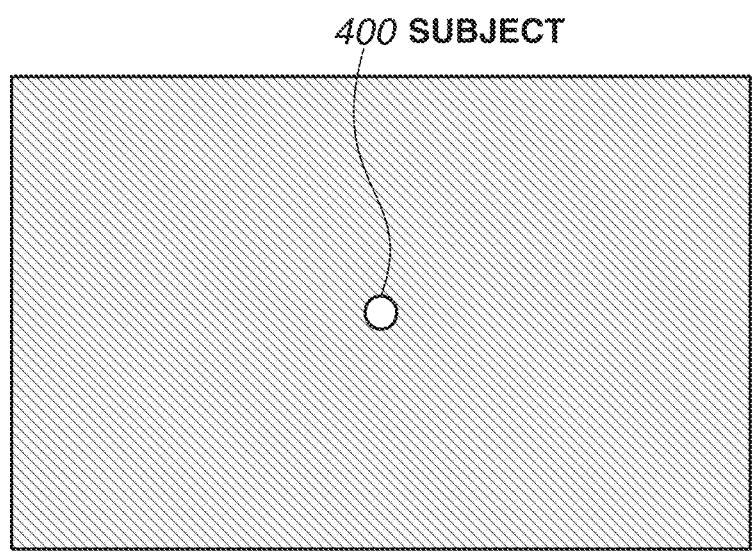
FIG. 4 is a diagram illustrating an example of a subject.
Figure 5:
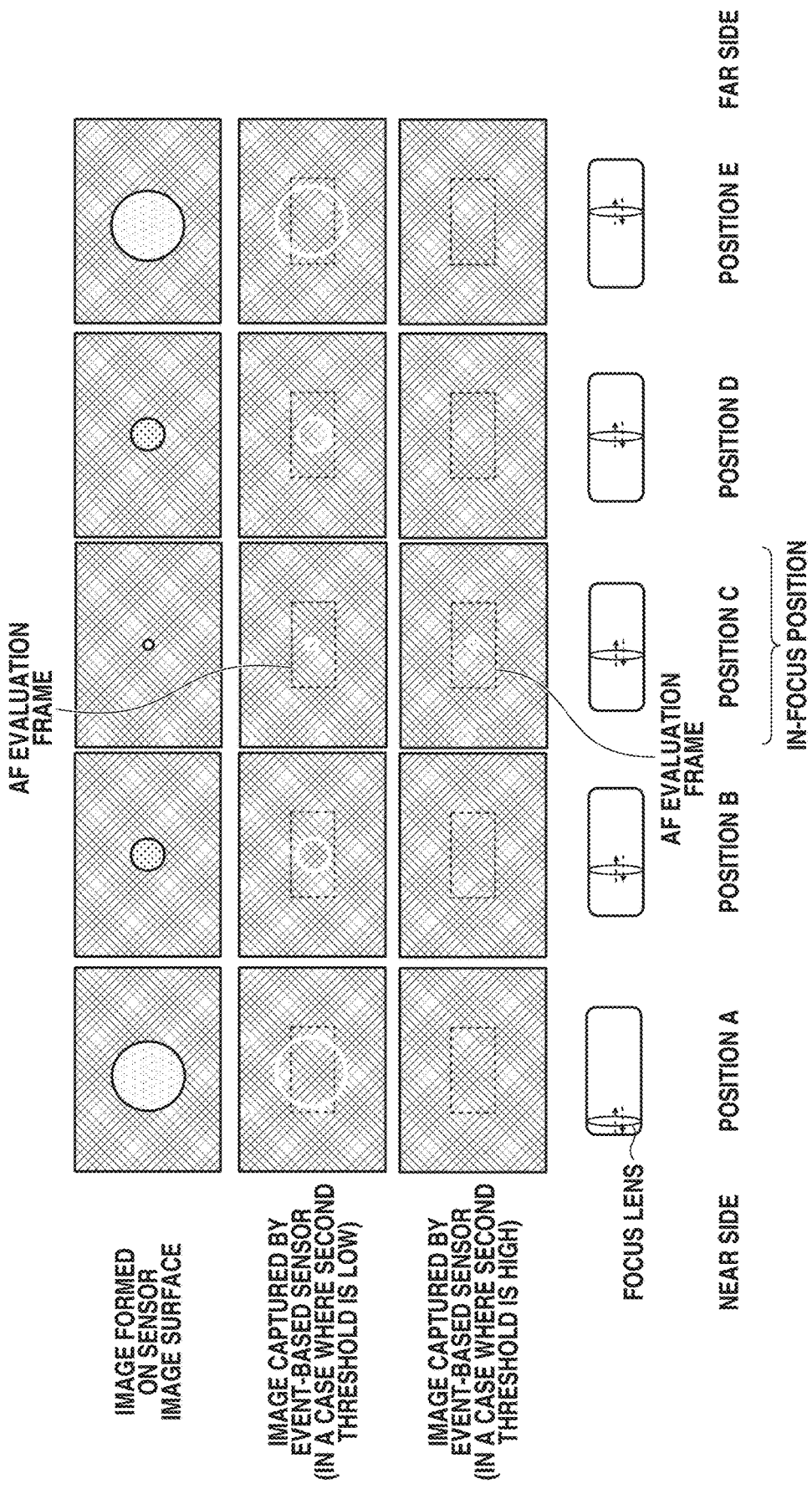
FIG. 5 is a diagram illustrating an example of a focus method.

Next, a luminance change caused by sweeping the second threshold will be described. FIG. 4 is a diagram illustrating a subject and a background. A round object in FIG. 4 is a subject 400, and has high luminance as compared with the background. Next, in FIG. 5, a subject image formed on the image surface of the photoelectric conversion element 1011 when the subject 400 in FIG. 4 is imaged by the imaging apparatus 100 and an image thereof captured by the photoelectric conversion element 1011 are arranged at each position of the focus lens. As the image captured by the photoelectric conversion element 1011, two images, namely, an image in a case where the second threshold is high and an image in a case where the second threshold is low, are arranged. As illustrated in FIG. 5, the subject image is blurred at each position except for a position C (the in-focus position) of the focus lens, and therefore, a subject image having a lower luminance value as being farther from an in-focus range is distributed in a wider range than the real subject. In this case, a luminance difference from the background is small. In a case where these subject images are captured by the photoelectric conversion element 1011 serving as the event-based sensor, the contour portion of the subject is detected at any position in a case where the second threshold is a sufficiently low value. On the other hand, when the second threshold is set to a high value, the subject is not detected at any position other than the position C that is the in-focus position. In actual autofocus, wobbling is performed at each lens position and simultaneously the second threshold is swept, and the value of the second threshold when the number of pixels of the detected luminance changes is more than or equal to the third threshold is determined as the evaluation value. The operation is repeated at each lens position, and a position corresponding to the highest evaluation value is determined as the in-focus position.

Alternatively, a predetermined value (a fourth threshold) may be prepared, and a position corresponding to an evaluation value exceeding the fourth threshold may be determined as the in-focus range. The fourth threshold here is a value greater than 0, and a preset value or a value set based on other parameter is used.

How to determine the lens moving direction in autofocus will be described.

Suppose autofocus starts now at a position B. In a case where the focus lens is moved to a position A and an evaluation value is acquired after an evaluation value is acquired at the position B, the evaluation value at the position A is lower than the evaluation value at the position B, and for this reason, it is possible to infer that the in-focus position is the position opposite to the position A. In this case, the focus lens may be moved in the far direction.

Conversely, in a case where autofocus starts at a position E, and the focus lens is moved to a position D and an evaluation value is acquired at the position D after an evaluation value is acquired at the position E, the evaluation value is higher. Accordingly, the in-focus position is in the near direction. In this way, the direction in which the in-focus position is present is inferred using an increase/decrease in the evaluation value in the first lens movement, so that the speed of autofocus can be increased.

<Output Unit>

The output unit 304 includes, specifically, a liquid crystal display device, a projector, a LED indicator, and the like, and displays the address of a pixel in which a luminance change has occurred and the direction of the luminance change, upon receiving an output signal of the event-based sensor. The images captured by the event-based sensor illustrated in FIG. 5 are images displayed by the output unit 304. At the coordinates of the pixel in which the luminance change has occurred, white is displayed in a case where the luminance change of the pixel is in the plus direction, black is displayed in a case where the luminance change is in the minus direction, and gray is displayed in a case where there is no luminance change. The convenience of the user may be improved by superimposing the AF evaluation frame or the like on the captured image. Further, the attention of the user may be attracted if a message saying that autofocus is running is superimposed onto the captured image or the message is displayed as pop-up during autofocus. Furthermore, the user may more easily recognize at which position relative to the background the AF evaluation frame is present, if the value of the last frame is displayed in each region except for the AF evaluation frame. Furthermore, the user may more easily recognize the luminance change in the AF evaluation frame if the luminance change is displayed in color (e.g., blue for a positive luminance change, and red for a negative luminance change) other than black and white only within the AF evaluation frame.

<Operation Acceptance Unit>

The operation acceptance unit 305 is a component with which the user controls the imaging apparatus 100. Specifically, the operation acceptance unit 305 accepts operations such as an autofocus start instruction, setting of the AF evaluation frame, and changing of the second threshold and the third threshold described above. The operation acceptance unit 305 includes a touch panel, a keyboard, a mouse, a cross key, an operation dial, and the like.

The output unit 304 and the operation acceptance unit 305 described above may be disposed in an external apparatus connected to the imaging apparatus 100 by a network cable, wireless transmission, or the like.

<Flowchart>

Figure 6:
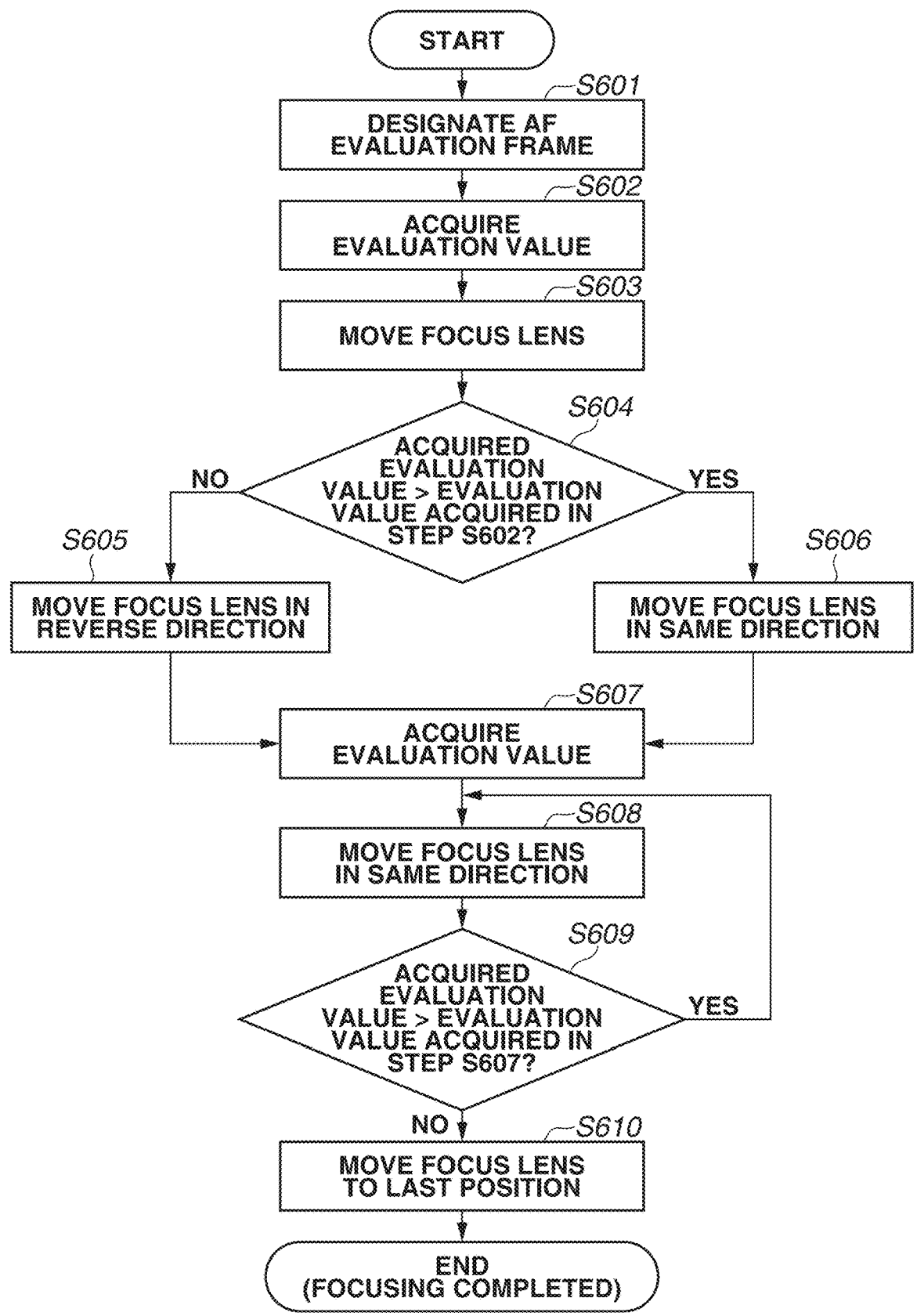
FIG. 6 is a flowchart illustrating processing executed by the imaging apparatus.

A flow of processing when the above-described autofocus is executed will be described. FIG. 6 is a flowchart illustrating processing executed by the imaging apparatus 100. The imaging apparatus 100 may not necessarily perform all the steps to be described in this flowchart.

In step S601, the operation acceptance unit 305 sets an AF evaluation region (a position and a size) based on a user input. In a case where there is no setting from the user, a predetermined AF evaluation frame is set.

In step S602, while the control unit 303 wobbles the focus lens and sweeps the second threshold of the photoelectric conversion element 1011 at the same time, the evaluation unit 302 acquires an evaluation value.

In step S603, the control unit 303 moves the focus lens by only a predetermined distance in a predetermined direction.

In step S604, the evaluation unit 302 acquires an evaluation value in a manner similar to step S602, and compares the acquired evaluation value with the evaluation value acquired in step S602. If the evaluation value acquired in step S604 is lower than the evaluation value acquired in step S602 (NO in step S604), the processing proceeds to step S605, and if the evaluation value acquired in step S604 is equal to or higher than the evaluation value acquired in step S602 (YES in step S604), the processing proceeds to step S606.

In step S605, because the evaluation value acquired in step S604 is lower than the evaluation value acquired in step S602, the in-focus position is determined to be in the reverse direction, and the focus lens is moved in the reverse direction, i.e., opposite to the direction in step S603.

In step S606, because the evaluation value acquired in step S604 is higher than the evaluation value acquired in step S602, the in-focus position is determined to be in the same direction, and the focus lens is moved in the same direction as the direction in step S603.

In step S607, the evaluation unit 302 acquires an evaluation value. The evaluation value acquired in step S607 is supposed to be higher than the evaluation value acquired in step S604, both in a case where the processing proceeds from step S605 to step S607 and in a case where the processing proceeds from step S606 to step S607.

In step S608, the focus lens is moved in the same direction as the direction in which the focus lens is moved in step S605 or step S606.

In step S609, the evaluation unit 302 acquires an evaluation value. Here, if the evaluation value acquired in step S609 is higher than the evaluation value acquired in step S607 (YES in step S609), the processing returns to step S608, and the focus lens is further moved in the same direction. If the evaluation value acquired in step S609 is lower than the evaluation value acquired in step S607 (NO in step S609), the last position can be determined as the in-focus position, and thus, in step S610, the focus lens is returned to the last position, and autofocus is completed.

<Variation of Wobbling>

A second exemplary embodiment is different from the first exemplary embodiment in terms of a scheme of focus lens control of a control unit 303 in evaluation value acquisition. According to a technique of the present exemplary embodiment, wobbling is not performed, so that there is such a benefit that control is simplified as compared with the first exemplary embodiment. A hardware configuration and a functional configuration of an imaging apparatus 100 are similar to those in FIG. 1 and FIG. 3 in the first exemplary embodiment.

Figure 7:
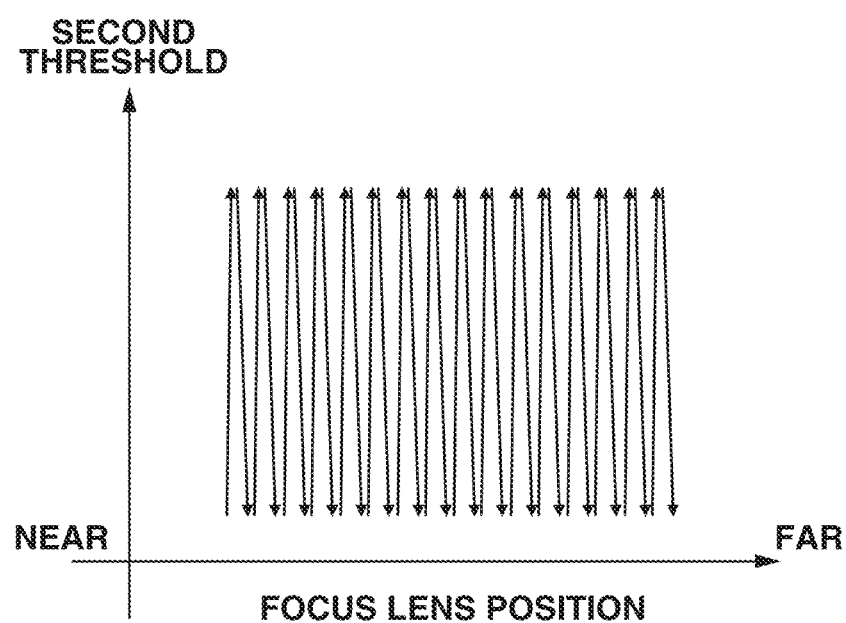
FIG. 7 is a diagram illustrating an example of control of a focus lens and a threshold.

The second exemplary embodiment will be described with reference to FIG. 7. FIG. 7 illustrates a control scheme of the control unit 303 in evaluation value acquisition. The horizontal axis indicates the position of the focus lens. The vertical axis indicates the value of the second threshold of a photoelectric conversion element 1011. In the present exemplary embodiment, while an evaluation unit 302 calculates an evaluation value, the control unit 303 keeps moving the focus lens in a fixed direction (in the direction from near to far) without wobbling the focus lens. In this process, the control unit 303 continuously sweeps the second threshold at a sufficiently high speed with respect to the moving speed of the lens. In other words, the control unit 303 completes acquisition of the evaluation value, while sweeping the second threshold from a low value to a high value, for a time in which the position of the focus lens can be regarded as the same position. Such control makes it possible to acquire the evaluation value at each position of the focus lens and determine a position corresponding to the highest evaluation value as the in-focus position. An evaluation value acquired in a manner similar to the first exemplary embodiment may be compared with a fourth threshold, and a position at which an evaluation value exceeds the fourth threshold may be regarded as the in-focus range.

By using the technique of the present exemplary embodiment, complicated wobbling control is not necessary, so as to obtain the benefit that a system can be easily designed.

<Variation on Graphical User Interface (GUI)>

A third exemplary embodiment is different in terms of operations of a control unit 303 and an output unit 304 when a user manually adjusts focus. According to a technique of the present exemplary embodiment, the user can easily perform manual focus. A hardware configuration and a functional configuration of an imaging apparatus 100 are similar to those in FIG. 1 and FIG. 3 in the first exemplary embodiment.

Figure 8A:
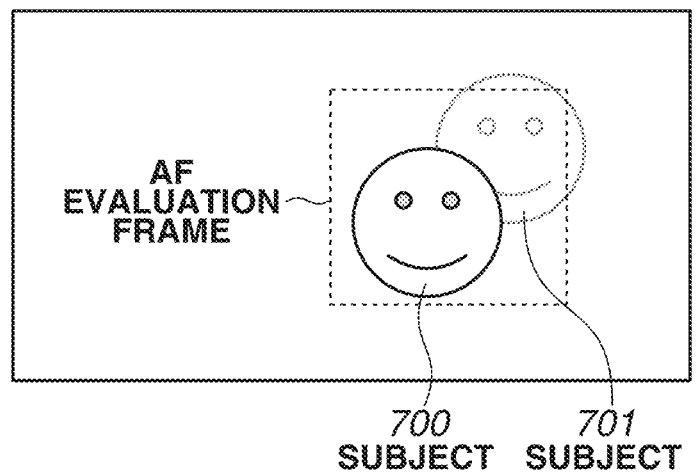
FIGS. 8A, 8B, and 8C are diagrams each illustrating an example of display.

According to the technique of each of the first and second exemplary embodiments, the user can focus on the subject by performing autofocus, but can additionally perform manual focus under special circumstances. In FIG. 8A, there are subjects 700 and 701 in an AF evaluation frame. Here, the subject 701 is farther than the subject 700, and suppose the subject 700 is a subject to be brought into focus. If autofocus is performed on such a subject arrangement, it is difficult for the imaging apparatus 100 to determine which one of the subjects 700 and 701 is to be brought into focus, and therefore, focus may be pulled toward the subject 701 in some situations. In such a case, in one embodiment, the user is to focus on a desired subject by performing manual focus after performing autofocus.

Here, the user may be clearly notified what kind of subject (luminance change) is distributed within the AF evaluation frame and which subject is brought into focus during autofocus. For example, a pixel in which a luminance change has occurred at a position corresponding to an evaluation value second from the top, among evaluation values acquired for the respective positions of the focus lens, is marked by a different color, and the pixel is superimposed on a captured image at the in-focus position. In this way, the user can understand the luminance change at the in-focus position and the luminance change at the position corresponding to the second evaluation value from the difference between the display colors, and can easily determine whether an unintended subject is brought into focus.

Figure 8B:
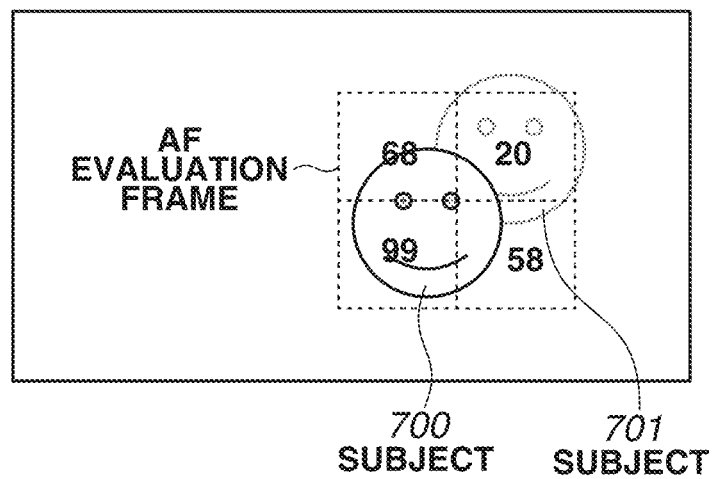

In the present exemplary embodiment, when the user performs manual focus, the user sets a manual focus mode via an operation acceptance unit 305. In the process, as illustrated in FIG. 8B, the AF evaluation frame in autofocus is divided into a plurality of small AF evaluation frames. The division may be automatically performed to obtain uniform areas, or may be performed to obtain non-uniform areas matching the shape of the subject. Alternatively, the user may set the individual AF evaluation frames. Upon entering the manual focus mode, the control unit 303 constantly wobbles the focus lens and sweeps the second threshold of a photoelectric conversion element 1011 at the same time, and an evaluation unit 302 acquires an evaluation value. The evaluation unit 302 acquires the evaluation value in each of the divided AF evaluation frames, and the acquired evaluation value is superimposed on the display screen as illustrated in FIG. 8B. In FIG. 8B, the number of each of the evaluation values is superimposed, but an indicator or the like for the user to understand a focus condition may be superimposed. As illustrated in FIG. 8B, the evaluation value of the AF evaluation frame widely occupied by the subject 700 is 99, which is higher than in other regions, and thus the subject 700 is in focus. If the evaluation value of the target subject is lower than in other regions, the user may manually move the focus lens while looking at the numerical value displayed in the target AF evaluation frame. By using the technique, the user can easily recognize the focus condition and the focus target, so that the user can easily perform manual focus.

Figure 8C:
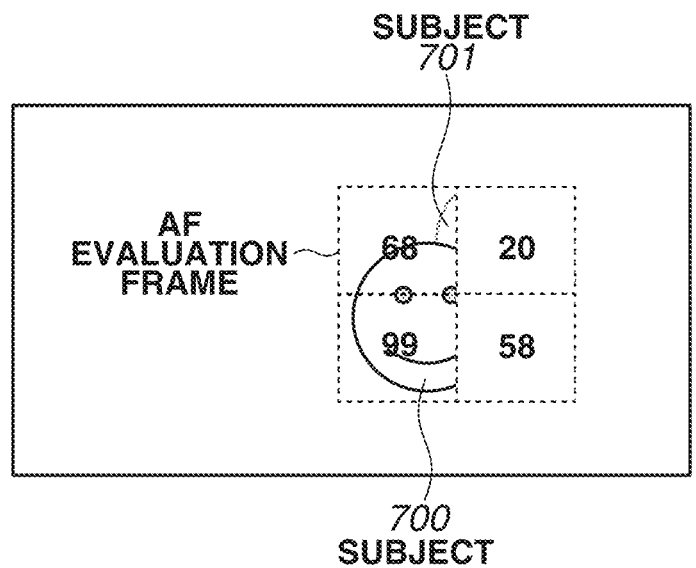

FIG. 8C illustrates a display example of a display unit 104 in a case where visibility for the user is further improved. In FIG. 8C, the subject in the AF evaluation frame having an evaluation value less than or equal to a predetermined evaluation value is masked not to be viewed by the user. In this case, it is desirable to superimpose only the numerical value in place of the subject, because the user can recognize that the subject is present behind the mask. The AF evaluation frame having an evaluation value greater than a predetermined value may have a display color different from those in other AF evaluation frames, or the display color of an address event of the subject may be different from those of other address events. Due to the display, the user can concentrate on the target subject, and thus, the user can easily perform manual focus.

As described above, by using the technique of the present exemplary embodiment, autofocus can be performed in the imaging apparatus employing the event-based sensor, so that the convenience of the user can be improved. In particular, the lens is wobbled and the parameter is vibrated at high frequency, so that the quality of the evaluation value is enhanced, and focusing can be accurately performed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-097304, filed Jun. 10, 2021, which is hereby incorporated by reference herein in its entirety.

What is claimed is:

1. An apparatus comprising:
a control unit configured to control a position of a focus lens of the apparatus;
a setting unit configured to change a threshold for detecting a luminance change in each pixel in a predetermined range;
an acquisition unit configured to acquire a signal indicating a pixel in which a luminance change that is more than or equal to the threshold has occurred; and
a determination unit configured to determine an in-focus position of the focus lens based on the signal detected depending on the position of the focus lens and the set threshold.

2. The apparatus according to claim 1,
wherein the determination unit determines a value based on a number of pixels having a luminance change depending on the position of the focus lens, and
wherein the determination unit determines the in-focus position of the focus lens based on a position of the focus lens at which the value is less than or equal to a predetermined reference value.

3. The apparatus according to claim 2, wherein the determination unit determines the value based on the signal in a partial region included in an angle of view of the apparatus.

4. The apparatus according to claim 3, wherein the determination unit determines the value in each of a plurality of regions included in the angle of view of the apparatus.

5. The apparatus according to claim 2,
wherein the setting unit changes the threshold at a predetermined rate of change, and
wherein the determination unit determines the threshold corresponding to a time when a number of pixels having a luminance change that is more than or equal to the threshold is less than the predetermined reference value as the value at the position of the focus lens.

6. The apparatus according to claim 5, wherein the control unit executes control for wobbling the focus lens with fixed amplitude.

7. The apparatus according to claim 6,
wherein the control unit moves the focus lens in a predetermined direction, and
wherein the determination unit determines the value at each position of the focus lens and determines a position at which the value is highest as the in-focus position.

8. The apparatus according to claim 2, further comprising a display unit configured to display an image indicating a position of a pixel in which a luminance change has occurred in a predetermined period and the value based on the signal.

9. The apparatus according to claim 8, wherein the determination unit displays an image generated based on the signal acquired before the predetermined period in a region in which the value is not to be acquired.

10. The apparatus according to claim 8, wherein the display unit displays a region for which the value is acquired and other region in such a way that colors of pixels in which the luminance change has occurred in the predetermined period are different.

11. The apparatus according to claim 8, wherein the display unit displays the regions in such a way that the colors of the pixels in which the luminance change has occurred in the predetermined period are different based on the value in each of regions into which an angle of view of the apparatus is divided.

12. The apparatus according to claim 2, further comprising a switching unit configured to switch a mode between a first mode of performing autofocus operation for moving the focus lens to a position at which the value is not acquired and a second mode of controlling the position of the focus lens to a position corresponding to a user input.

13. The apparatus according to claim 12,
wherein the control unit wobbles the focus lens in the second mode, and
wherein the determination unit determines the threshold corresponding to a time when the threshold for detecting a luminance change in each pixel is changed and a number of pixels in which a luminance change has occurred is less than or equal to the predetermined reference value as the value.

14. The apparatus according to claim 2, wherein the determination unit determines the value at each position of the focus lens and determines a position at which the value is highest as the in-focus position.

15. The apparatus according to claim 2,
wherein the determination unit determines the threshold corresponding to a time when a number of pixels having a luminance change that is more than or equal to the threshold is less than the predetermined reference value as the value at the position of the focus lens, and
wherein the determination unit determines a position of the focus lens at which the value exceeds a predetermined value as the in-focus position.

16. The apparatus according to claim 1, wherein the signal is output by a conversion element including a pixel that outputs an output signal based on incidence of photons.

17. The apparatus according to claim 16, wherein the conversion element includes an avalanche photodiode.

18. A non-transitory computer readable storage medium storing a program for causing a computer to execute a method for an apparatus, the method comprising:
controlling a position of a focus lens of the apparatus;
changing a threshold for detecting a luminance change in each pixel in a predetermined range;
acquiring a signal indicating a pixel in which a luminance change that is more than or equal to the threshold has occurred; and
determining an in-focus position of the focus lens based on the signal detected depending on the position of the focus lens and the set threshold.

19. A method for an apparatus, the method comprising:
controlling a position of a focus lens of the apparatus;
changing a threshold for detecting a luminance change in each pixel in a predetermined range;
acquiring a signal indicating a pixel in which a luminance change that is more than or equal to the threshold has occurred; and
determining an in-focus position of the focus lens based on the signal detected depending on the position of the focus lens and the set threshold.

* * * * *